Figure 1:
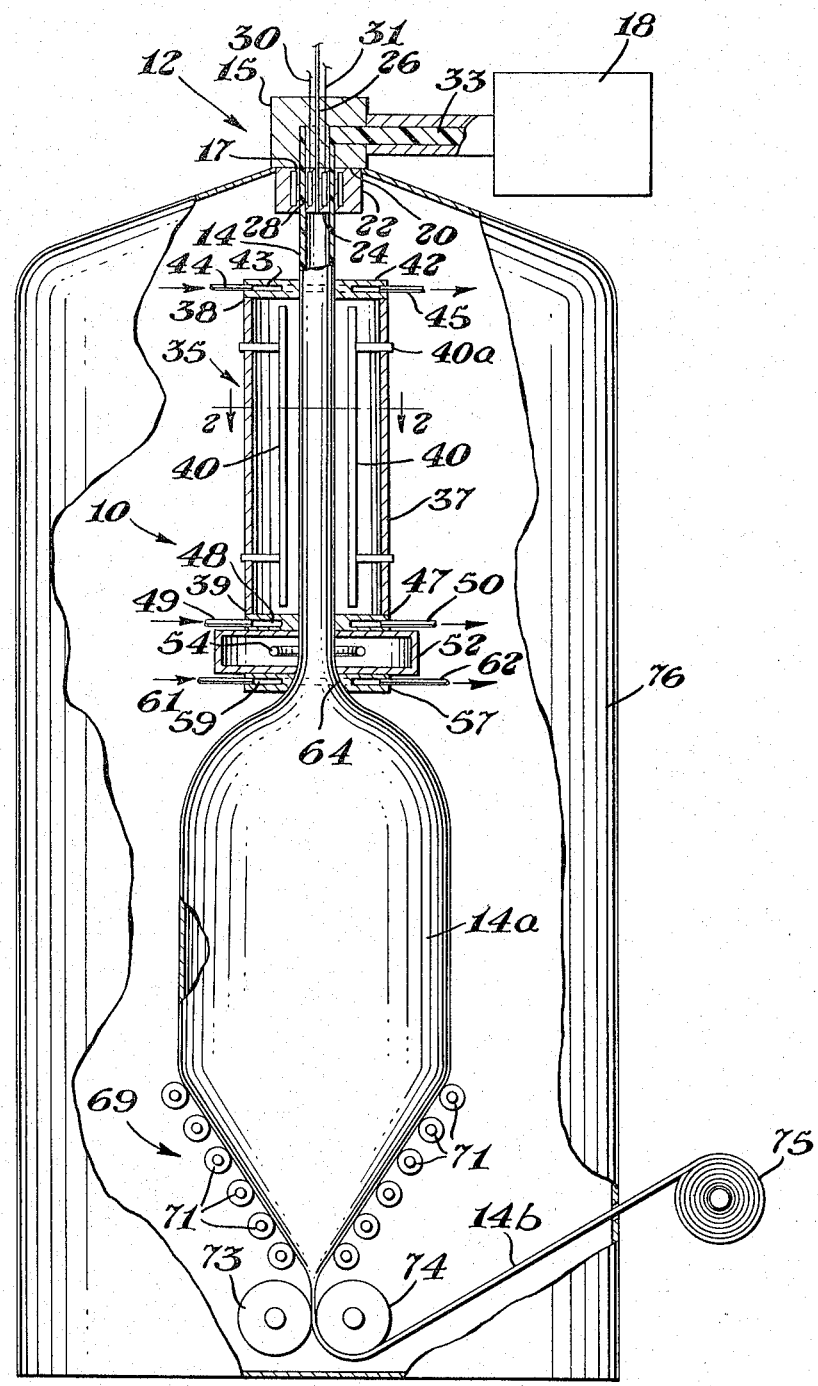

Feb. 7, 1967 — R. E. LEMMER ET AL — 3,302,241
APPARATUS FOR PREPARATION OF PLASTIC TUBES
Original Filed April 18, 1962 — 2 Sheets-Sheet 1

INVENTORS.
Robert E. Lemmer
Gordon E. Gould
BY
AGENT

Feb. 7, 1967  R. E. LEMMER ETAL  3,302,241
APPARATUS FOR PREPARATION OF PLASTIC TUBES
Original Filed April 18, 1962  2 Sheets-Sheet 2
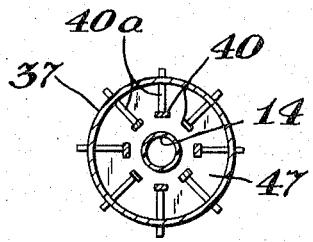
Fig. 2
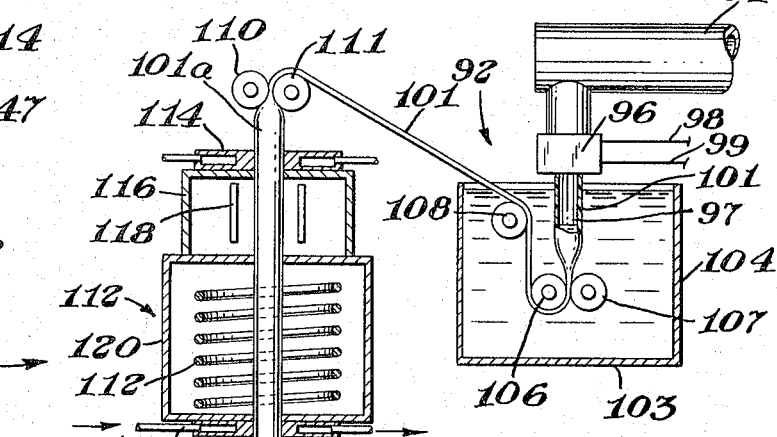
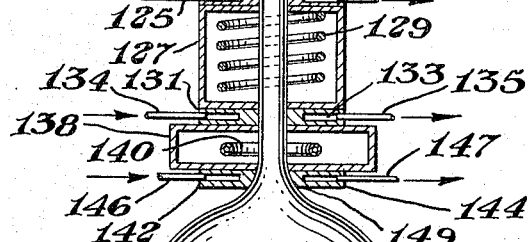
Fig. 3
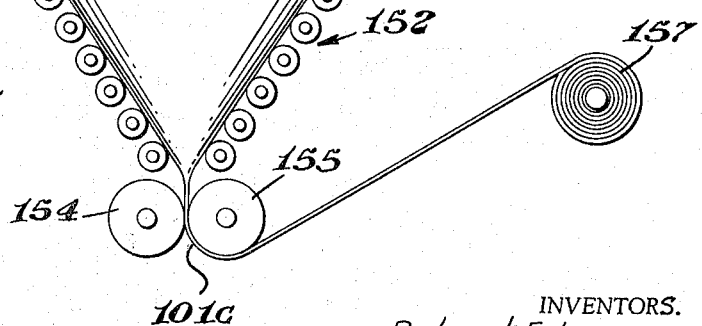
INVENTORS.
Robert E. Lemmer
Gordon E. Gould
BY
Robert B. Ingraham
AGENT

United States Patent Office 3,302,241
Patented Feb. 7, 1967

3,302,241
APPARATUS FOR PREPARATION OF
PLASTIC TUBES
Robert E. Lemmer, Saginaw, and Gordon E. Gould,
Breckenridge, Mich., assignors to The Dow Chemical
Company, Midland, Mich., a corporation of Delaware
Original application Apr. 18, 1962, Ser. No. 188,363.
Divided and this application Nov. 5, 1964, Ser. No.
417,259
7 Claims. (Cl. 18—14)

This application is a divisional application of application Serial No. 188,363, filed April 18, 1962, now Patent No. 3,235,632.

The present invention relates to an apparatus for the production of thin wall tubing or film from a thermoplastic resinous material which may be oriented after extrusion, cooling and re-heating. The invention more particularly relates to an improved apparatus which permits the production of uniformly oriented thermoplastic resinous film having improved physical properties and extremely uniform wall thickness.

In the past, fabrication of uniformly oriented thermoplastic film has been difficult, and highly uniform wall thickness together with optimum physical properties were not readily attained by utilizing the extrusion and orienting techniques known to the art. In many applications, it is very desirable that a film having maximum strength, thickness, uniformity and non-directional properties be utilized in order to attain maximum efficiency in the utilization of the polymeric material.

Generally it has been extremely difficult to obtain a uniformity of wall thickness in extruded thermoplastic materials wherein the maximum deviation from the average wall thickness has been less than about ±10 percent. Such variations generally are inherent in the process due to minor deviations and variations within the mechanical components of the system such as the die, the extrusion rate, minor mechanical and thermal fluctuations in the material being oriented.

It is an object of the present invention to provide an improved film from resinous tubing.

It is a further object of the invention to provide an apparatus for the manufacture of a thermoplastic resinous film from an extruded quenched tube.

It is a further object of this invention to provide an apparatus for the fabrication of thin tubing and sheets having highly uniform properties which are substantially the same in all directions of the film.

It is an additional object of this invention to provide a thin thermoplastic resinous tube having extremely uniform wall thickness.

These objects and other advantages are achieved in accordance with the invention by providing a tube of an orientable thermoplastic resinous material, preheating said tube to a temperature below the temperature at which it will orient, mechanically restraining said tube from transverse motion, heating said tube to at least its orientation temperature, mechanically restraining said tube from transverse motion, applying an internal fluid pressure to said tube sufficient to cause said tube to be circumferentially oriented to a desired degree, simultaneously drawing said tube from the region from where said tube is heated at a rate sufficient to produce longitudinal orientation and subsequently collapsing said tube to a flat sheet.

Also contemplated within the scope of the invention is an apparatus for the biaxial stretching of orientable thermoplastic resinous tube, the apparatus comprising in cooperative combination a means to supply a thermoplastic tube, a heating oven adapted to receive said thermoplastic resinous tube, the oven being provided with a first end adjacent said tube supply means and a second end, said second end being adapted to engage said tube in substantially sealing engagement, a heating means disposed within said heating oven adapted to heat said thermoplastic resinous tube, said film engagement means at said second end of said oven being disposed immediately adjacent to a second heating oven, said second heating oven having a first end and a second end, said first end generally adjacent said first oven, said second end of said second oven provided with means to engage said thermoplastic resinous tubular film in sealing engagement therewith and said tube engaging means being smoothly, outwardly flaring on its side remote from the second oven, said tube engaging means adjacent the first and second ends of said second oven being provided with means to control the temperature thereof, a tube collapsing means disposed generally adjacent to and generally axially disposed with respect to and facing the second end of said second oven, pinch rolls adjacent to said tube collapsing means remote from said second oven, said rolls generally centered on and having a nip lying on the common axes of the first and second oven, said nip rolls adapted to draw and forward said collapsed tube and means at a rate to orient said tube to a desired degree and means to maintain the inner surfaces of the collapsed tube in sealing engagement.

Further features and advantages of the invention will become more apparent when taken in conjunction with the following specification and drawing wherein:

FIGURE 1 depicts a schematic sectional view of an apparatus in accordance with the invention, and FIGURE 2 depicts a sectional view of the apparatus of FIGURE 1 along the line 2—2, and FIGURE 3 is a schematic sectional view of an alternate embodiment of an orientation apparatus in accordance with the invention.

FIGURE 1 is a schematic sectional representation of an apparatus generally designated by the reference numeral 10 in accordance with the invention. The apparatus 10 comprises, in cooperative combination, a means 12 for the supply of an unoriented thermoplastic resinous tube 14. The means 12 comprises an annular die head 15 having therein an annular extrusion orifice 17 in communication with a source of molten polymeric material 18. The die 15 has a die face 20 having affixed thereto a cooling jacket 22 and an internal mandrel 24. The internal mandrel 24 is provided with a generally centrally positioned passageway 26. The mandrel 24 defines an internal annular chamber 28 which is in operative communication with heat exchange fluid passageways 30 and 31, to carry a heat exchange fluid to and from a source (not shown). An extrudable thermoplastic resinous polymeric material 33 is forced into the annular die head 15 and issues from the extrusion head 12 as a chilled hollow tube 14. A heating means or oven 35 is disposed generally adjacent to said film supply means 12 and is generally coaxial therewith. The heating means of oven 35 comprises a body portion 37 having a first end 38 adjacent the tubing supply means 12 and a second end 39. Disposed within the housing 37 are a plurality of heating elements 40. Generally remote from said tubing supply 12 and adjacent said first end 38 is disposed a tubing guide 42. The tubing guide 42 defines an inner cavity 43 for the circulation of heat exchange fluid and it is in operative communication with the heat exchange fluid supply means 44 and heat exchange fluid outlet 45. Disposed adjacent the second end 39 of the oven 35 is a tubing guide 47 defining an internal cavity 48 which is in operative communication with a heat exchange fluid supply means 49 and a fluid outlet means 50. A second oven 52 is provided immediately adjacent the tubing guide 47. A generally ring-like heating element 54 is disposed within the oven 52 and is generally positioned coaxially with respect to the tube 14. A third tubing guide 57 is positioned immediately adjacent the second oven 52 and is disposed remote from the tubing guide 57. The tubing guide 57 is provided with an internal cavity 59 which is in operative communication with a heat exchange fluid inlet 61 and a heat exchange outlet 62. The guide 57, remote from the heating oven 52, is provided with a face 64 which is gently outwardly flaring and adapted to support and contact the tube 14 as it is expanded and oriented to become the bubble or tube 14a. A bubble or tube collapsing means, generally designated by the reference numeral 69, is disposed along the common axes of the first and second ovens and generally facing the guide ring 57. The tube collapsing means 69 comprises a plurality of rolls 71 which converge away from the ovens 37 and 52. A pair of nip rolls 73 and 74 are positioned adjacent the tube collapsing means 69, remote from the oven 52. These rolls 73 and 74 serve to seal the inner surfaces of the flattened tube 14b together and prevent loss of the inflating fluid disposed within. The flattened tube 14b is wound onto the mill or takeup roll 75. The bubble and heating assembly are positioned beneficially within an enclosure 76 in order to minimize disturbance of the temperature by unwanted air current.

In FIGURE 2 there is shown a sectional view of the oven 37 taken along the line 2—2 of FIGURE 1 wherein the positioning of the heating elements 40 and the support means 40a is set forth.

In operation of the embodiment in accordance with FIGURE 1, thermoplastic resinous material is extruded from the extrusion assembly or tubing supply means 12, it is then chilled by the cooling mandrel 24 and the jacket 22 below the temperature at which it may be oriented. Beneficially, the tubing 14 is passed into the tubing guide 42 through the heating oven 37 where it is raised to a temperature just below the temperature at which it may be oriented. The tubing 14 then passes through the tubing guide 47 which, by means of heat exchange fluid supplied through the inlet 49 and exhausted through the outlet 50, maintains the guide at a temperature approximately equal to the temperature of the heated tube. Preferably, the guide 47 is maintained at a temperature substantially identical to the heated tube. The tube 14 and the guide 47 are in close engagement to prevent any major passage of air from the oven 52 into the oven 37. On leaving the guide 47 the tubing 14 is passed into the oven 52 where it is quickly raised by means of the heat from the element 54 to a temperature at which it is deformed by the internal fluid pressure supplied by the passageway 30 of the tube supply means 12. Generally it is advantageous in the practice of the invention to construct the orienting apparatus in such a manner that relative motion between the nip rolls and the outwardly flaring tubing guide is possible in order to provide a means of obtaining precise control of the internal pressure within the bubble, particularly in such cases where a fixed quantity of gas is employed in the trapped bubble operation. The tubing being stretched or oriented, that is, the portion of the transition section between the tube 14 and the bubble 14a is in engagement with the outwardly flaring surface 64 of the tubing guide 59 which is maintained at a temperature as close as possible to that of the expanding tubing by means of heat exchange fluid circulating within the tubing guide. The bubble 14a, after being formed by means of the fluid pressure within the tube, then passes into the collapsing section 69 which serves to transform the cylindrical tube portion 14a to the flattened tube 14b. The bottom nip rolls 73 and 74 are driven at a speed sufficient to maintain the desired degree of longitudinal orientation which is generally about equal to the degree of the orientation imparted by the circumferential stretching. Beneficially the entire bubble portion is enclosed within an enclosure, as is shown in FIGURE 1, and is designated by the reference numeral 76, which helps to prevent uneven cooling of the tube and subsequent nonuniformity in orientation and wall thickness.

In FIGURE 3 there is illustrated an alternate embodiment of the invention, generally designated by the reference numeral 90. The apparatus 90 comprises a tubing supply means 92 which consists of a tube extrusion apparatus 94 having a generally annular die 96. The die 96 is provided with an internal cooling mandrel 97 which is in communication with a refrigerated heat exchange fluid by means of the fluid inlet 98 and the fluid outlet 99. A tube 101 of thermoplastic resinous material is extruded from the annular orifice (not shown), from the die 96, about the cooled mandrel 97. The tube is rapidly quenched by means of the liquid 103 contained in the bath 104. The tubing 101 passes through the pinch rolls 106 and 107 which is brought upwardly above the surface of the liquid 103 and over the surface of the roll 108. The tubing 101 is then carried to a second pair of pinch rolls 110 and 111. Disposed adjacent to the pinch rolls 110 and 111 is a tube heating assembly generally designated by the reference numeral 112. The heating assembly 112 comprises a tubing guide 114 adjacent the rolls 110 and 111; disposed adjacent to the heating guide 114 and the rolls 110, is a heating oven 116. The oven 116 contains therein a plurality of heaters 118 generally disposed about the tubing 101a passing through the oven. Adjacent the oven 116 is an oven 120 and the oven 120 is generally coaxially aligned with the oven 116. Within the oven 120 is disposed a helical heating coil 122 which is generally coaxial with the tube 101a. Adjacent to the oven 120 and disposed remotely from the oven 116 is a tubing guide 125. Tubing guide 125 is adapted to maintain close engagement with the tube 101a and prevent free passage of gases therethrough. Adjacent the tubing guide 125 is a heating oven 127 having disposed therein a helical heating element 129. The element 129 is disposed generally coaxially with the tube 101a. Adjacent the oven 127 and remotely disposed from the guide 125 is guide 131. The guide 131 defines an internal cavity 133 adapted to receive the heat exchange fluid from the heat exchange supply means 134 and exhaust the fluid through the discharge passage 135. The guide ring 131 is adapted to substantially impede the passage of gas between the guide ring and the tube 101a. Disposed immediately adjacent the guide 131 is an oven 138. The oven 138 has disposed therein a generally ring-like heating element 140 which is substantially coaxially disposed relative to the tube 101a. Immediately adjacent the heating oven 138 is a tubing guide 142. The tubing guide 142 defines an inner cavity 144. The cavity 144 is in communication with a heat exchange supply means, not shown, by means of the fluid inlet 146 and the fluid outlet 147. The guide 142 defines a tube engaging face 149 which is smoothly, outwardly flaring away from the oven 138 and adapted to engage the tube 101a as it expands. The tube 101a expands into the bubble 101b substantially as in the embodiment of FIGURE 1 and is collapsed by the tube collapsing assembly 152. The flattened tube 101c is maintained in sealing engagement by rolls 154 and 155. The flattened tube 101c is wound onto the mill roll 157.

Operation of the embodiment shown in FIGURE 3 is substantially similar to FIGURE 1 with the exception that a flattened tube is supplied to the reheating and orienting apparatus. The heating section comprises a plurality of ovens rather than a single oven, thus permitting greater flexibility of control when different orientable thermoplastic resinous materials are utilized. The rate of heating also is more easily controlled as the first three ovens, 116, 120 and 127, are individually temperature controlled and the heat elements of each may be displaced to compensate for non-uniformities in wall thickness occurring in the tube 101a. As in the embodiment of FIGURE 1 the guides 131 and 142 are maintained at temperatures approximating the temperature of the tube at that point. As inflation of the bubble is usually accomplished by direct injection of gas in a single addition provision is made to move the pinch and/or collapsing rolls with respect to the terminal guide ring in order that close control of internal pressure be maintained.

In the foregoing illustrations, heating power supply means, fluid and electrical connections have been omitted for the sake of clarity as well as the drive means to the rolls. These are well known to those skilled in the art.

Apparatus in accordance with the invention is readily constructed from a wide variety of material from which such devices are conventionally fabricated. Typically the pinch rolls such as 73, 74, 110, 111, 154, and 155 are constructed from a soft yieldable material, such as rubber, which permits the tube to pass therebetween and allows the interior surface of the tube to be maintained in sealing engagement without excessively deforming the edge portions of the flat tube as would occur if a pair of hard non-yieldable rolls were utilized. Beneficially, the guide rings are fabricated from a metal and faced on the inner surface with a low friction material, such as polytetrafluoroethylene, or alternately they are prepared from a thermally non-conducting material and subsequently faced with polytetrafluoroethylene, nylon, and the like material. In some cases metals are advantageous for the tube guides and include such materials as steel, brass and like metals without facings. The tube guides such as 47, 57, 131 and 142 which are adjacent to the higher temperature heating chambers such as the chambers 52 and 138 are beneficially constructed from metal and provided with an internal pasageway for a heat exchange fluid in order that the temperature may be maintained as close as possible to the temperature of the tube and heat shall neither leave nor enter the tubing in any significant amount at the guide surface. Such metallic guides are also found convenient in cases wherein the tubing may rupture or inadvertently become entangled during start-up of the operation.

Beneficially, the heating chamber utiilzes a plurality of separate and individually adjustable heating elements in order that any irregularities occurring within the tube may be compensated for by differential heating of the polymeric material. Thus, in order to obtain a highly uniform oriented tube, it is essential to the practice of the invention that the tube be heated in such a manner that a uniform product is obtained. This is done by providing a sectional heating section such as ovens 37 and 116 wherein any variations in the tube wall thickness may be compensated for by providing a greater or a lesser quantity of heat to the selected portions of the unstretched tube in order that stretching and orientation will take place to a uniform thickness when the tube is finally raised to its orienting temperature. The initial heating of the tube in the case of a completely uniform tube would result in a uniform temperature. However, in practice such a uniform tube is generally not obtained and is compensated for in the initial heating sections such as the oven 37 of FIGURE 1 or the ovens 116, 120 and 127 of FIGURE 3. A tube which has a non-uniform wall thickness will be heated in a nonuniform manner until the tube obtains a temperature just below the temperature at which it can be stretched by the internal pressure. The final or terminal oven such as oven 52 of FIGURE 1 serves to raise the temperature of the tube to the stretching temperature and at such time it starts to expand. The expanding tube is then engaged by the smoothly, outwardly flaring guide ring which prevents any mechanical motion or variation of the tube and is also a critical component in obtaining a tube having an extremely uniform wall thickness. Beneficially, in the embodiment of FIGURE 3, heating is readily accomplished by the use of a spiral winding of resistance wire to which the electrical input may be readily controlled, thus resulting in a precise and accurate control of the amount of heat added to the tube during its traverse of the chambers.

It is essential in the practice of the invention that the tube be held rigidly by the tube guides adjacent the final heating section. A positive air seal must be provided adjacent the final heating zone in order to minimize random air or gas currents from passing the surface of the tubing. Such random currents give rise to uncontrolled variations and deviations in the film thickness. Beneficially the tubing guide provides both a support and the gas seal for the tubing just prior to the final heating zone and more particularly the last tubing guide, prior to its expansion to a bubble, must not introduce any nonuniformity of temperature or mechanical deformation. Beneficially, the entire operation of reheating the tube and its expansion into a bubble and subsequent collapsing into a flattened tube is carried out in an enclosure which prevents random air currents or drafts from striking the bubble. Orientation of the tube is readily varied by altering the temperature of the final guide ring.

It is particularly advantageous to supply to the orienting apparatus such as 10 an extruded tube which is relatively uniform in wall thickness and has been prepared by extruding the tube from an annular orifice and drawing it around a forming mandrel which is maintained at a temperature sufficient to chill the tube very rapidly.

In practice, this is advantageously carried out by extruding a thermoplastic resinous tube around a forming mandrel which serves to chill the internal surface of the tube and beneficially the outer surface of the tube by extruding within an external jacket such as 22 of FIGURE 1 or into the liquid at a suitable temperature such as the liquid 103 of FIGURE 3. Beneficially in the extrusion of such a tube as a polypropylene tube the internal mandrel is maintained at a temperature of −20 to a temperature of 50° centigrade and will be preferably from about −10 to about 15° centigrade. Similarly where the extruded tubing is being quenched by an external bath, the bath should be maintained at about the same temperature as the internal mandrel.

The rapid cooling of the molten tube from both sides minimizes any cooling and forming stresses that are usually caused when a tube or sheet is cooled from one side only. Beneficially the rapid cooling of the molten tube and the support given by the internal mandrel permits it to be sized relatively accurately without undue distortion which oftentimes is introduced by random cooling factors or a mechanical takeaway apparatus usually associated with a tube extrusion operation.

*Example I.*—Molten polypropylene having a melt index of approximately 1.5 is extruded at a temperature between 210–240° centigrade through an annular die two inches in diameter and having an annular orifice 0.045 inch in width. The cooling mandrel has a top diameter of 1.8 inches and a length of approximately 3 inches. The mandrel was immersed in a bath having a temperature of about 10° centigrade at an extrusion rate of about 24 pounds per hour resulting in an unoriented extruded tube having a diameter of 1.9 inches and a wall thickness of about 0.040 inch.

The flattened unoriented polypropylene film tubing having an outside diameter of approximately 1⅞ inches when in a circular shape and having a wall thickness of about 0.040 inch was passed through a pair of driven rubber pinch rolls about 3 inches in diameter at a speed of about 2.9 feet per minute. The tubing was distended by internal air pressure to a circular cross section as it passed through a guide ring positioned as guide ring 114 of FIGURE 3. The guide ring was neither heated nor cooled and had an inside diameter of about 1 29/32 of an inch. Immediately adjacent the guide ring was a first heating chamber which comprised a housing about 13 inches long which contained 4 radiant electrical strip heaters each 8 inches in length and aligned generally parallel to the axis of the tube. The four strip heaters were spaced axially about the center line of the tubing on a circle having a diameter of about 7 inches. After startup of the operation, the heaters were individually adjusted to compensate for minor nonuniformity of the tubing wall. This adjustment was made by varying the power input to the individual heaters. A second heating housing was provided corresponding to the heating chamber 120 of FIGURE 3. This housing was 23 inches long and contained a resistance wire helically wound on a diameter of about 9 inches and the length of the helix was about 18 inches. A power input of about 930 watts was used in this section. The tube was then passed through a guide corresponding to the guide 55 of FIGURE 1 which was 1 29/32 of an inch inside diameter and provided an air seal between the chamber equivalent to chamber 120 and the chamber equivalent to chamber 127 of FIGURE 3. This ring was operated at a heat exchange fluid temperature of about 108° centigrade. The chamber equivalent to chamber 120 was about 9 inches long and contained a helical winding of resistance wire. The helical winding was about 6 inches in length and 3 11/16 inches in diameter. This section was operated at a power input of about 270 watts. This oven is provided with means to adjust the location of the helix with respect to the axis of the tube in order that nonuniform heat output from the previous heaters and nonuniform tube wall thickness would receive additional compensation. The adjustment was made in such a manner that the axis of the tube and the axis of the helix remained in parallel relationship. A 108° centigrade temperature controlled liquid tubing guide was provided equivalent to the tubing guide 131 also having an internal diameter 1 29/32 inches adjacent the temperature controlled chamber equivalent to chamber 127. Immediately adjacent and opposite to the cooled tubing guide a heating housing approximately 2 inches in length and containing a heating element which was made from resistance wire wound to a diameter of about ½ inch and bent into a generally toroidal configuration having an inside diameter of about 3½ inches. This section is operated at a power input of about 700 watts. A final tubing guide was positioned adjacent the final heating housing equivalent to the tubing guide 142 of FIGURE 3. The guide had a minimum inside diameter of about 3 inches and gently flared outwardly away from the adjacent heating zone to conform to the shape of the expanding tubing. The guide was provided with a heat exchange liquid at a temperature of about 108° centigrade. The tubing was then passed to a set of converging or collapsing rolls and subsequently to a pair of 6 inch diameter pinch rolls operating at a speed of 22 feet per minute. This represented a draw ratio of approximately 7.6 to 1. Sufficient air was injected into the bubble to provide a bubble diameter of 13.2 inches which was about 7 times the diameter of the unoriented tube. The polypropylene film had the following physical properties:

ample showed no embrittlement at a temperature of −30° centigrate.

The maximum variation of the polypropylene film prepared in accordance with the invention was ±2 percent which is in sharp contrast to conventional extrusion techniques wherein deviations of ±10 percent are considered acceptable and frequently production specifications of ±15 percent are used.

*Example II.*—In a similar manner to the foregoing example, polyethylene film was extruded to give a product having a Mullen burst strength of 7.1 p.s.i. using a 0.2 mil thick film. The tensile strength in the machine direction was 13,700 p.s.i. and in the transverse direction was 19,850 p.s.i. The elongation in the machine direction prior to breaking was 36 percent and in the transverse direction was 30 percent. The film showed a drop impact strength at 25° centigrade of 3.55 kilograms per mil.

In a similar manner other orientable thermoplastic resinous materials other than the polyolefin such as polyethylene, polypropylene, and resinous copolymers thereof are oriented to high strength uniform films in accordance with the invention. Typical of these orientable resinous materials which are oriented on reheating are sarans, styrene polymers such as polystyrene, copolymers of styrene and acrylonitrile. Particularly beneficial of the styrene acrylonitrile copolymers are those containing 70 percent styrene and 30 percent acrylonitrile, polyvinylchloride and vinyl chloride copolymers such as copolymers comprising 85 percent vinyl chloride and 15 percent vinyl acetate. Also beneficially adapted for the practice of the present invention are the extrudable polyester resins such as those commercially available under the trade name of Mylar.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. An apparatus for the biaxial stretching of an orientable extruded thermoplastic resinous tube, said apparatus comprising in cooperative combination,
   means to supply a thermoplastic resinous tube,
   a heating oven adapted to receive the thermoplastic resinous tube in substantially cylindrical form, said oven having a first end and a second end, said first end having means to engage said tube in substantially sealing

TABLE I.—PHYSICAL PROPERTIES OF POLYPROPYLENE FILM

| Thickness (in.), ±2 percent | 0.00050 | 0.00075 | 0.000100 |
|---|---|---|---|
| Burst (Mullen), p.s.i. | 35 | 50 | 60 |
| Impact (dart drop), ft. lb. at room temperature | 1.1 | 1.5 | 2.3 |
| Tensile Strength (inclined plane), p.s.i: | | | |
| Machine direction | 26,500 | 24,500 | 23,000 |
| Transverse direction | 32,000 | 32,500 | 30,500 |
| Ultimate Elongation, percent: | | | |
| Machine direction | 65 | 70 | 80 |
| Transverse direction | 50 | 50 | 60 |
| Gas Transmission, cc./100 sq. in./24 hrs./atmosphere at 75° F.: | | | |
| Air | 90 | 65 | 50 |
| Oxygen | 260 | 190 | 140 |
| Carbon dioxide | 760 | 620 | 460 |
| Water Vapor Transmission, gms./100 sq. in./24 hrs. | 0.680 | 0.475 | 0.375 |

| Shrink (in glycerin for 1 min.), percent: | 50° C. | 75° C. | 100° C. | 140° C. |
|---|---|---|---|---|
| Machine direction | 0 | 4 | 7 | 27 |
| Transverse direction | 0 | 4 | 11 | 41 |

Conventional cast polypropylene film is found to embrittle by a drop impact test at about 0° centigrade. Oriented polypropylene film prepared in the foregoing exengagement therewith, said second end being adapted to engage said tube in substantially sealing engagement, the oven defining a space between the ends sufficiently large to permit passage of the tube without contact between the tube and the oven, the oven being so constructed and arranged so as to prevent significant movement of gas into or out of the oven when a tube is in engagement with the first and second ends and passing through the oven, radiant heating means disposed within said heating oven adapted to selectively heat said thermoplastic resinous tube, a second oven disposed generally adjacent from said first oven and immediately adjacent said film engagement means at said second end of said oven, said second heating oven having a first end and a second end, said first end being generally adjacent said first oven, said second end of said second oven carrying means to engage said thermoplastic resinous tubular film in sealing engagement therewith and said means being smoothly outwardly flaring remote from the second oven, the oven defining a space between the ends sufficiently large to permit passage of the tube without contact between the tube and the oven, the oven being so constructed and arranged so as to prevent significant movement of gas into or out of the oven when a tube is in engagement with the first and second ends and passing through the oven, said tubing engagement means adjacent said first and second ends of said second oven being provided with means to control the temperature thereof, a tube collapsing means disposed generally adjacent to and generally axially disposed with respect to the second end of said second oven, pinch rolls adjacent to said tube collapsing means remote from said second oven, said pinch rolls generally centered on and having a nip lying on the common axis of said first and second ovens, said rolls adapted to draw and forward said collapsed tube at a rate to orient said tube to a desired degree and to maintain the inner surfaces of the collapsed tube in sealing engagement.

2. The apparatus in accordance with claim 1, wherein said first oven is provided with a plurality of individually controlled elongate heating elements generally aligned in parallel relationship to the axis of said tube.

3. The apparatus in accordance with claim 2, wherein said second oven is provided with a generally annular heater positioned within said second oven and substantially coaxial with said tube.

4. The apparatus of claim 1, wherein said tube supply means comprises a tubing extruder arrangement to axially extrude a tube with respect to said first oven, said tube extruder being provided with means to cool said extruded tube on leaving its annular orifice.

5. The apparatus of claim 1, wherein said tube engaging means adjacent the first and second ends of the second oven define internal cavities and are in association with means to provide a supply of heat exchange fluid.

6. The apparatus of claim 1, wherein said apparatus is within an enclosure adapted to prevent the random movement of air about said bubble.

7. The apparatus of claim 1, wherein said tube supply means comprises:

a downwardly extruding tube forming extrusion means, said extrusion means having an internally cooled mandrel adapted to engage the inner surface of the extruded tube, a cooling bath positioned immediately adjacent said extrusion head and adapted to cool the outer surface of the extruded tube adjacent the inner mandrel, means to convey said extruded cooled tube, a pair of pinch rolls, said pinch rolls being positioned adjacent said first end of said first oven and the nip of said pinch rolls being disposed substantially coaxial with the axis of said ovens and disposed at right angles thereto.

References Cited by the Examiner

UNITED STATES PATENTS

| 2,320,564 | 1/1943 | Brooks | 18—6 |
| 2,377,494 | 6/1945 | Greene | 18—14 X |
| 2,476,140 | 7/1949 | Francis | 264—95 |
| 2,519,375 | 8/1950 | Jargstorff et al. | |
| 2,529,897 | 11/1950 | Bailey et al. | 18—14 X |
| 2,634,459 | 4/1953 | Irons | 264—95 |
| 2,688,773 | 9/1954 | McIntire | 264—95 |
| 2,937,402 | 5/1960 | Pierce | 18—14 |
| 2,947,032 | 8/1960 | Taylor | 18—14 |
| 3,068,516 | 12/1962 | Hofer | 18—14 X |
| 3,119,147 | 1/1964 | Kracht | 18—6 X |
| 3,178,495 | 4/1965 | Richards et al. | 264—95 |
| 3,190,739 | 6/1965 | Wilson | 18—14 X |

FOREIGN PATENTS 214,099   9/1957   Australia.

WILLIAM J. STEPHENSON, *Primary Examiner.*